United States Patent
Weinhappl

(10) Patent No.: US 6,594,353 B1
(45) Date of Patent: Jul. 15, 2003

(54) METHOD AND SYSTEM FOR CONNECTING SUBSCRIBERS OF A TELECOMMUNICATION NETWORK IN A SWITCHING CENTER

(75) Inventor: Josef Weinhappl, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/297,242

(22) PCT Filed: Oct. 23, 1997

(86) PCT No.: PCT/DE97/02471

§ 371 (c)(1),
(2), (4) Date: Apr. 27, 1999

(87) PCT Pub. No.: WO98/19472

PCT Pub. Date: May 7, 1998

(30) Foreign Application Priority Data

Oct. 28, 1996 (DE) ................................ 196 44 787

(51) Int. Cl.$^7$ ................................................ H04M 3/00
(52) U.S. Cl. ........................................ 379/196; 370/467
(58) Field of Search ........................... 370/466, 467, 370/469; 379/196, 242

(56) References Cited

U.S. PATENT DOCUMENTS

| 4,914,690 A | | 4/1990 | Hagedorn |
| 5,182,748 A | * | 1/1993 | Sakata et al. |
| 5,416,835 A | | 5/1995 | Lee |
| 5,546,450 A | * | 8/1996 | Suthard et al. ............. 379/207 |
| 5,905,873 A | * | 5/1999 | Hartmann et al. .......... 370/389 |
| 5,915,008 A | * | 6/1999 | Dulman ....................... 379/201 |
| 5,991,375 A | * | 11/1999 | Stahl et al. .................. 370/401 |
| 5,999,810 A | * | 12/1999 | Fuente ........................ 455/417 |

FOREIGN PATENT DOCUMENTS

| EP | 0 540 256 A2 | 5/1993 |
| EP | 0 557 645 A2 | 9/1993 |

OTHER PUBLICATIONS

Schema Translation Into a Unified Model for Service Operation, Ohkubo, pp. 1010–1015.
Mapping Strategies for a Relational View of the No. 1A ESS Translations Data Base, Lee et al., pp. 136–140.

* cited by examiner

Primary Examiner—Creighton Smith
(74) Attorney, Agent, or Firm—Bell Boyd & Lloyd LLC

(57) ABSTRACT

A method and system for connecting subscribers of a telecommunication network in a switching center which includes an input for receiving signaled data, a means for forming and processing connection-related data from the data received at the input side, and a means for signaling the processed data at the output thereof, wherein there is provided a means for the conversion of connection-related data into neutral parameters with the aid of a predetermined parameter list, a means for processing there neutral parameters independent of the original format of the connection-related data, and a means for the back-conversion of the processed neutral parameters into connection-related data with the aid of the parameter list in order to send these back-converted data to the output after a neutral evaluation or, respectively, modification.

9 Claims, 2 Drawing Sheets

METHOD AND SYSTEM FOR CONNECTING SUBSCRIBERS OF A TELECOMMUNICATION NETWORK IN A SWITCHING CENTER

BACKGROUND OF THE INVENTION

The present invention relates to a method and a system for connecting subscribers of a telecommunication network in a switching center that includes an input for receiving signaled data, a means for forming and processing connection-related data from the data received at the input side, and a means for signaling the processed data at the output thereof.

Due to the modernization of telecommunication networks, new signaling methods (analog, digital, ISDN) and the addition of available services in a switching center result in more expensive connection control. Where earlier a simple switching through of subscriber A to subscriber B on the basis of the selected call number was sufficient, now more and more information has to be taken into account when a call is switched through; e.g., the category of the call (telephone, fax, modem), the desired network operator, bearer capabilities (quality and data rate of the operator), category of the subscriber, etc. In the course of connection control, it is now necessary with increasing frequency to evaluate the data received at the outset, according to particular criteria, and to modify it if warranted.

In known apparatuses, the sequence program of the connection control must be modified correspondingly in order to enable the use of new services or information; i.e., the logic for evaluation and modification of connection-related data must be fundamentally reprogrammed. However, this is connected with a considerable expense that results in high costs for the network operator. In addition, errors can occur during reprogramming of the connection control which can lead to lasting problems.

From EP-0 540 256 A2, an arrangement is known for call handling in a switching means, in particular for the maximally flexible management of numbering plans of different communication networks. An adaptation of an existing switching means, given modifications or expansions of the numbering plan originally supported by it, is avoided by grammatically analyzing the numbers of the communication network according to the numbering plan, in the manner of a language in the mathematical/information-technological sense. Data structures independent of the numbering plan are thereby used for the determination of the call-related numerals and services. Thus, symbol strings are received whose contents are determined by the application of syntax and grammar according to the stored data structures, and a handling of the call is defined independent of the respective numbering plan. The dependencies of the switching means on the supported numbering plan are specified solely by the content of the data structures, so that for modifications or expansions of the already-existing numbering plan only corresponding adaptations of the definitions in the data structures are to be carried out. In this way, it is possible for the switching means to be able to implement any numbering plan by means of the arrangement for call handling.

From EP-0 557 645 A2, a method is known for the external calling of performance features of a switching means that includes an internal numbering plan in a communication network with an associated network numbering plan. A call processing means of the switching means thereby uses stored information such as syntax and grammar of the respective numbering plans. The switching means receives a call-related symbol sequence and interprets it as an equivalent access code of a performance feature, and subsequently calls it.

From the article "Schema translation into a unified model for service operation," a model is known for service handling in which a mutual communication of processing systems becomes possible by translation of the respective individual local schema into a unified schema. From the article "Mapping strategies for a relational view of the No. 1A ESS translations data base," a method is known for the imaging, for modeling purposes, of a complex database for the example of a switching means. This database is constructed in structured form for a maximally effective call handling and storing of the data. The model creates an indirect interface to the database in order to apply a preceding or subsequent strategy for the management of the database accesses.

From U.S. Pat. No. 5,416,835, a method is known for the automatic identification of the type of signaling used on the basis of a call for the setup of a connection to a central switching means. Detectors for determining whether a two-tone multifrequent signaling is present are thereby arranged in the vicinity of the switching means. From U.S. Pat. No. 4,914,690 a universal interface is known between a private branch exchange and a central switching means, which enables support even of telephone installations that are not compatible with the private branch exchange, by means of standardized conversion.

It is therefore an object of the present invention to create a method and a system for processing connection-related data that is as independent as possible of the individual signaling methods and that can be adapted easily and economically.

SUMMARY OF THE INVENTION

This object is inventively solved in a method and system wherein, by means of a predetermined allocation with the aid of a predetermined parameter list, the connection-related data is converted into neutral parameters independent of the original format of the data. These parameters are then processed in their neutral format by the switching center. Thereafter, the data to be signaled at the output side is formed from the neutral parameters by means of the predetermined allocation, with the aid of the parameter list, by means of back-conversion.

According to the present invention, a system for the solution of the above-stated object includes a means for converting connection-related data into neutral parameters with the aid of a predetermined parameter list, a means for processing these neutral parameters independent of the original format of the connection-related data, and a means for conversion of the processed neutral parameters back into connection-related data with the aid of the parameter list; these back converted data being sent at the output of the switching center for connection controlling. For the processing of the neutral parameters, a data revaluing unit and a data modification unit are provided wherein the data revaluing unit is set up so as to evaluate the data received at the input side after conversion into neutral parameters, and the data modification unit is set up to modify the neutral parameters which are either dependent on the result of the evaluation by the data revaluing unit or dependent on the result of the allocation by the conversion means, or dependent on output-side control parameters. By means of this "neutralization" of the connection-related data independent of the signaling method or, respectively, of the format and definition of this data, the evaluation and modification of the data can be executed in uniform fashion for all signaling methods and data formats.

Given the addition of new signaling methods or new services, it is often sufficient to add particular entries to the parameter list in order to ensure orderly allocation of newly incoming connection-related data into neutral parameters, wherein the evaluation thereof and back-conversion thereof is into format-dependent data. The sequence program of the data evaluation and modification accordingly remains unmodified so that in such cases the expense for adapting a switching center can be lowered considerably.

In a preferred embodiment of the inventive method, it is provided that each neutral parameter is formed dependent on the signaling method used, such as TUP, ISUP, MFC-R2, whereby a corresponding parameter set is defined in the parameter list for each allowed signaling method. In addition, in this embodiment it is useful to define for each parameter of the parameter list a particular data format and a particular value range.

Given the use of a digital transmission protocol for central signaling channels (CCS=Common Channel Signaling), such as ISUP, TUP, GSM, the connection-related data is that which is defined in the various signaling methods as messages serving for the connection setup (mandatory and optional messages) or, respectively, message contents; e.g., the entries of the initial address message (IAM) or, sequential address message (SAM) of an ISUP transmission protocol. Each message or, respectively, each individual message part, e.g., each entry of the ISUP message (IAM, SAM), is converted with the aid of the parameter list into a respective modification unit. After an evaluation by the data revaluing unit, the neutral parameters of the connection-related data can be modified dependent on this evaluation by means of a data modification unit. Alternatively, the neutral parameters of the connection-related data can be modified by a data modification unit already before their processing by the data revaluing unit, dependent on the result of the data allocation. It is likewise possible to subsequently modify the neutral parameters dependent on output-side control conditions. By this means, a maximally flexible evaluation or, respectively, modification of the data in their neutral format is possible.

Additional features and advantages of the present invention are described in, and will be apparent from, the following Detailed Description of the Invention and the Drawings.

DETAILED DESCRIPTION OF THE INVENTION

In order to switch through calls from a subscriber A to a subscriber B, corresponding inputs and outputs are provided in a switching center, combined with one another via a connection control. The terminals can be of various types; e.g., individual terminals, private branch exchanges, mobile terminals, terminals for connecting lines and terminals for databases and/or monitoring computers. These terminals can be occupied in analog or digital fashion wherein, in principle, various protocol variants, such as ISUP, TUP, ISDN, GSM, DECT, etc., are available, especially for digital terminals.

Figure 1:
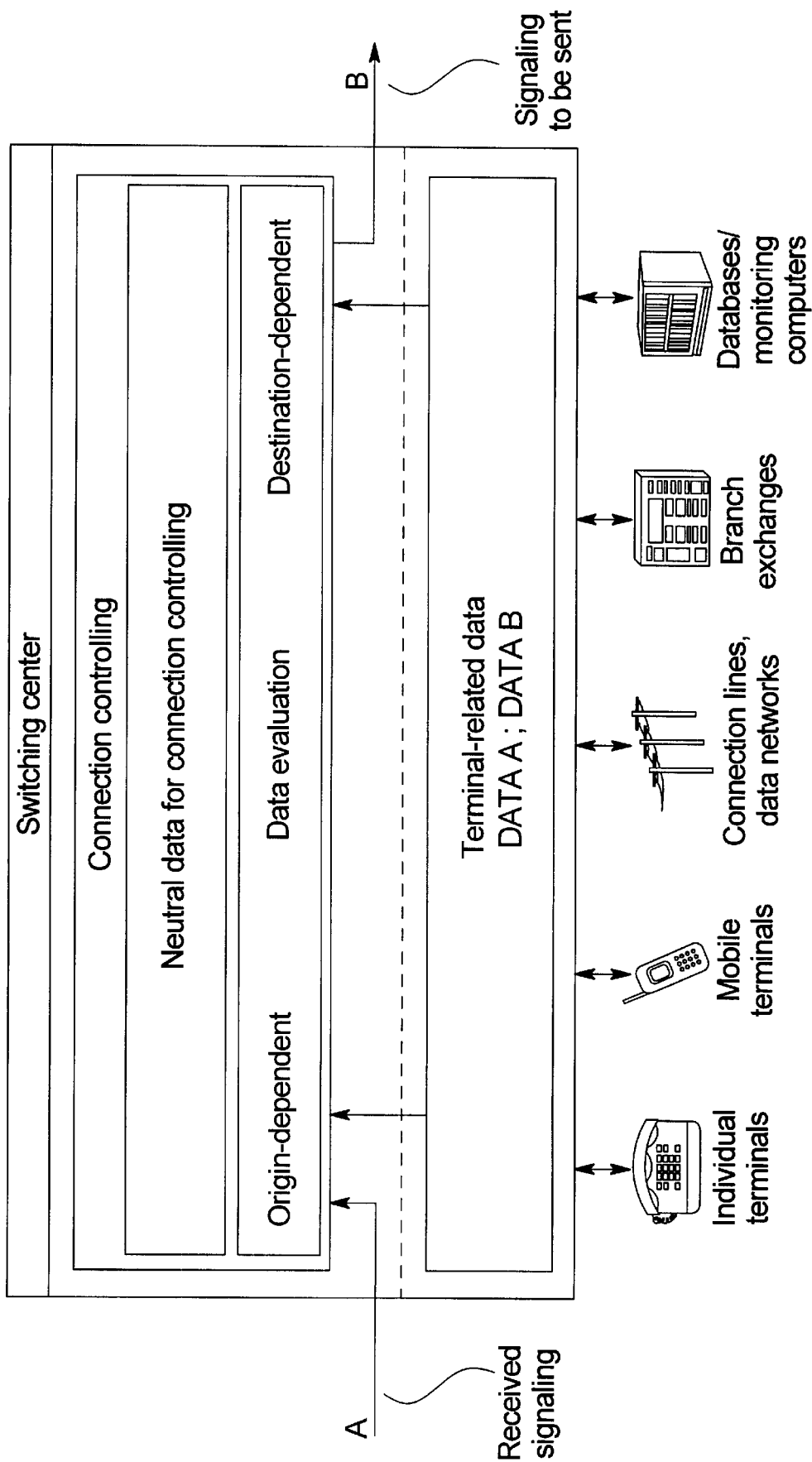
FIG. 1 shows a schematic diagram of the method and system of the present invention.
Figure 2:
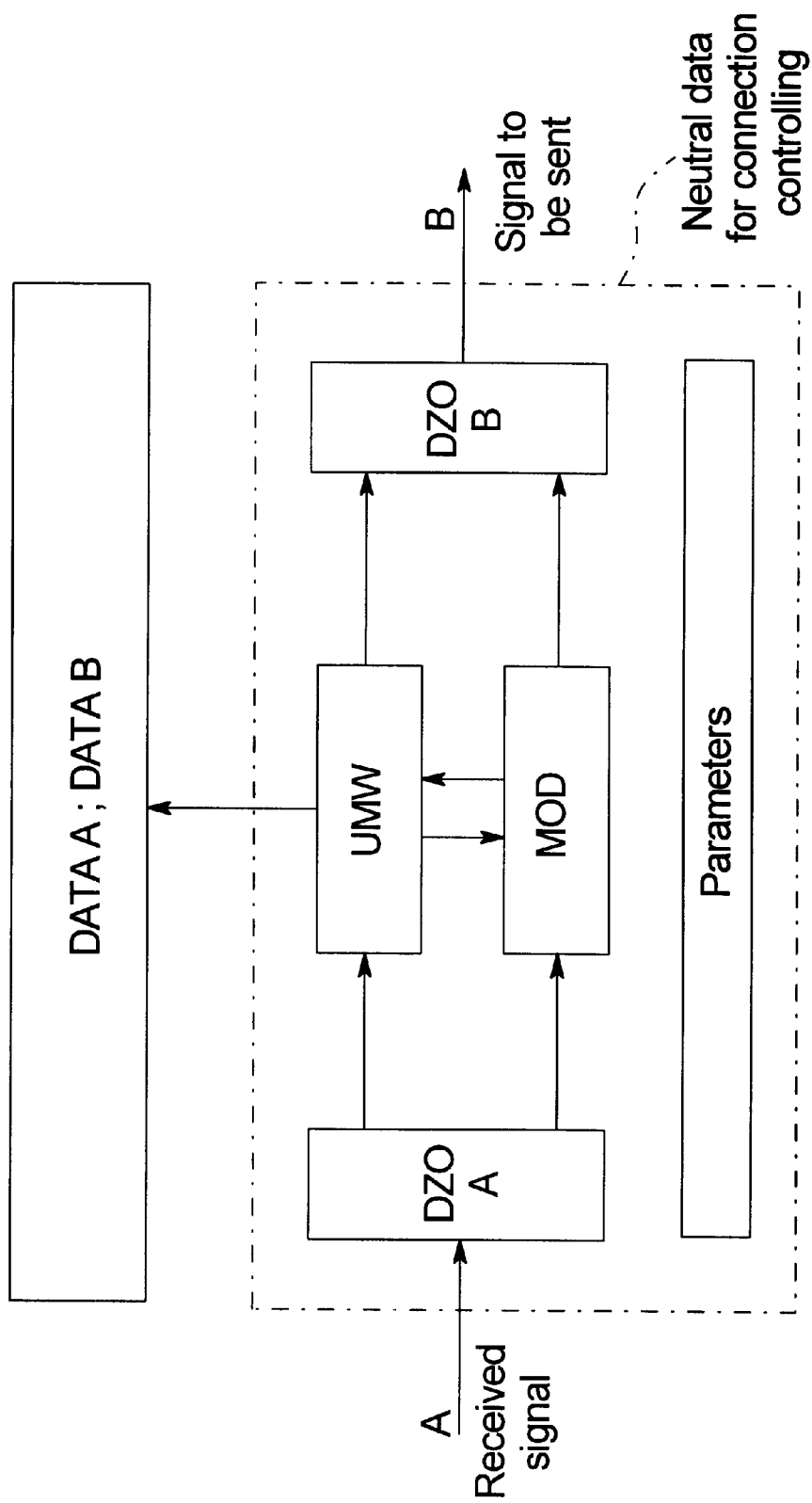
FIG. 2 is a schematic representation of the connection control method and system of the present invention.

For all existing terminals, terminal-related data required by the switching center for connection controlling is stored in the switching center. In FIG. 2, the terminal-related data is designated DATA A; DATA B and wherein A designates the terminal data of the input-side terminal and B designates the data of the output-side terminal.

If a signal is received by the switching center at one of the inputs, the data transmitted in this signal must be transposed into a neutral format. This data allocation is executed by means of a logic unit DZO A, which has access both to the allocated terminal-related data DATA A and to a parameter list PARAMETER in which the allocation regulations for the conversion of format-related data into neutral parameters are stored. In the parameter list, a certain number of possible parameters are defined, e.g. PAR1, PAR2, PAR3, . . . , PAR256, whereby a set of allocation regulations is predetermined for each parameter dependent on the possible signalings.

For connection control by means of the switching center, in digital transmission methods a particular message is sent on central signaling channels (CCS) =Common Channel Signaling); namely, an Initial Address Message (IAM) or, if warranted, additional messages called Sequential Address Messages (SAM). In these messages, particular data is stored in individual entries which is relevant for the connection control (e.g., category of the A subscriber), call number of the A and B subscriber, desired service (voice, fax, modem), etc. In the context of the present invention, it has proven advantageous to define a particular parameter for each of the possible entries of an IAM or SAM; e.g., a respective parameter for the call number of the A and B subscriber, a respective parameter for the desired service, a respective parameter for the category of the A subscriber, etc.

In the allocation by means of the logic unit DZO A, each of the parameters required for the connection control is allocated an abstract value; e.g., a numerical value or a string. The allocation is dependent on the signaling method used, so that a particular parameter definition is present for each supported signaling method and for each parameter of the parameter list PART, . . . , PAR256. In addition, in the parameter definition it is defined whether the entry is located in an IAM or an SAM (message ID). In order to check the allocation, indications of the result to be expected also can be contained in the parameter definition; e.g., a value range, a number of digits, or the like. If individual parameters are not supported by a signaling method (e.g., given analog signaling), these parameters can be set, to default values by means of the data allocation logic unit DZO-A, in case they are required later. If warranted, the default values can also be produced during the later evaluation and modification of the neutral parameters.

The neutral parameters formed by the data allocation logic unit DZO-A are now further processed by means of a data revaluing unit UMW. In this data revaluing unit UMW a uniform sequence program is installed for the evaluation of the neutral parameters, in order to obtain from these neutral parameters a result that is relevant for the connection control.

If the evaluation yields the result that another modification of certain parameters is required for a successful connection setup, a data modification unit MOD is driven for this purpose which modifies the supplied parameters corresponding to requirements. The result of the modification is typically handed over again to the data revaluing unit UMW for new evaluation of the modified parameters.

If warranted, the requirement of a modification of individual neutral parameters also can be defined by means of the data allocation logic unit DZO A. In this case, the data modification unit MOD can be controlled directly by the data allocation logic DZO A.

After an evaluation and, if warranted, a modification of the neutral parameters of the connection control, these parameters are handed over to a data allocation unit DZO B which, with the aid of the parameter list and the terminal related data DATA B, produces the format-related data for the signal to be sent; e.g., a new IAM or SAM, which is subsequently sent to the relevant output.

If warranted, the requirement of a subsequent evaluation or modification of individual connection-related data can be forced by B-side terminal conditions or control conditions. In this case, the terminal data or control data DATA B required for the modification can be transposed into a neutral format using the data allocation logic unit DZO A, and processed correspondingly by means of the data revaluing unit UMW and data modification unit MOD.

Although the present invention has been described with reference to specific embodiments, those of skill in the art will recognize that changes may be made thereto without departing from the spirit and scope of the invention as set forth in the hereafter appended claims.

I claim:

1. A method for connecting subscribers of a telecommunication network, wherein connection-related data is processed independent from a signaling method of signaled input data received by a switching center, the method comprising the steps of:
   receiving signaled input data at an input side of the switching center;
   forming connection-related data from the input data;
   converting the connection-related data into neutral format parameters independent of an original format of the connection-related data via a predetermined allocation using a predetermined parameter list;
   processing the neutral format parameters by the switching center; and
   forming output data to be signaled at an output side of the switching center from the neutral format parameters by back-conversion via the predetermined allocation using a predetermined parameter list.

2. A method for connecting subscribers of a telecommunication network as claimed in claim 1, further comprising the steps of:
   forming each neutral format parameter dependent on the signaling method used; and
   storing a corresponding parameter set in the parameter list for each signaling method used.

3. A method for connecting subscribers of a telecommunication network as claimed in claim 2, further comprising the step of:
   defining both a particular data format and a particular value range for each parameter of the parameter list.

4. A method for connecting subscribers of a telecommunication network as claimed in claim 1, further comprising the steps of:
   defining the connection-related data as that which is defined in the signaling methods as one of messages and message contents serving for a connection setup; and converting the connection-related data, using the parameter list, into a respective neutral format parameter for further processing via a data revaluing and data modification unit.

5. A method for connecting subscribers of a telecommunication network as claimed in claim 4, further comprising the step of:
   modifying the neutral format parameters of the connection-related data by the data modification unit after their evaluation by the data revaluing unit wherein the modification is dependent on the evaluation.

6. A method for, connecting subscribers of a telecommunication network as claimed in claim 4, further comprising the step of:
   modifying the neutral format parameters of the connection-related data by the data modification unit before their processing by the data revaluing unit, wherein the modification is dependent on a result of the data allocation.

7. A method for connecting subscribers of a telecommunication network as claimed in claim 4, further comprising the step of:
   modifying the neutral format parameters, after their evaluation and modification, dependent on output-side control parameters.

8. A system for connecting subscribers of a telecommunication network in a switching center, wherein connection-related data is processed independent from a signaling method of signaled input data received by the switching center, comprising:
   an input for receiving signaled input data;
   a means for forming and processing connection-related data from the input data;
   a means for conversion of the connection-related data into neutral format parameters using a predetermined parameter list;
   a means for processing the neutral format parameters independent of an original format of the connection-related data;
   a means for back-conversion of the processed neutral format parameters into connection-related data using the parameter list; and
   an output for outputting the back-converted connection-related data.

9. A system for connecting subscribers of a telecommunication network in a switching center as claimed in claim 8, further comprising:
   a data revaluing unit, wherein the data revaluing unit evaluates the input data after the conversion thereof into neutral format parameters; and
   a data modification unit, wherein the data modification unit modifies the neutral format parameters dependent on one of the result of the evaluation by the data revaluing unit and the result of the allocation by the means for conversion.

* * * * *